US009686472B2

(12) United States Patent
Kimura (10) Patent No.: US 9,686,472 B2
(45) Date of Patent: Jun. 20, 2017

(54) IMAGE PICKUP APPARATUS AND CONTROL METHOD FOR SAME

(71) Applicant: CANON KABUSHIKI KAISHA, Tokyo (JP)

(72) Inventor: Takayuki Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 89 days.

(21) Appl. No.: 14/799,652

(22) Filed: Jul. 15, 2015

(65) Prior Publication Data

US 2016/0037086 A1  Feb. 4, 2016

(30) Foreign Application Priority Data

Jul. 31, 2014 (JP) .................................. 2014-156070

(51) Int. Cl.
*H04N 5/232* (2006.01)
*H04N 5/225* (2006.01)

(52) U.S. Cl.
CPC ....... *H04N 5/23296* (2013.01); *H04N 5/2258* (2013.01); *H04N 5/2259* (2013.01); *H04N 5/23229* (2013.01)

(58) Field of Classification Search
CPC ............. H04N 5/23296; H04N 5/2258; H04N 5/2259; H04N 5/23229
See application file for complete search history.

(56) References Cited

U.S. PATENT DOCUMENTS

| | | | |
|---|---|---|---|
| 5,936,628 A | 8/1999 | Kitamura et al. | |
| 7,679,657 B2 | 3/2010 | Morita | |
| 8,044,994 B2 | 10/2011 | Vetro et al. | |
| 2007/0296837 A1* | 12/2007 | Morita | H04N 3/155 348/240.99 |
| 2008/0043096 A1 | 2/2008 | Vetro et al. | |
| 2015/0207999 A1* | 7/2015 | Han | H04N 5/23296 348/240.3 |

FOREIGN PATENT DOCUMENTS

| | | |
|---|---|---|
| JP | 2007-329685 | 12/2007 |
| JP | 2008-257686 | 10/2008 |

\* cited by examiner

*Primary Examiner* — Christopher K Peterson
(74) *Attorney, Agent, or Firm* — Fitzpatrick, Cella, Harper & Scinto (57) ABSTRACT

Provided is a compound-eye image pickup apparatus in which a plurality of imaging units, each of which configured to photoelectrically convert an optical image focused by a single focal lens with different focal length so as to output a signal, are arranged in the form of a matrix. An image processing unit performs an electronic zoom process for changing a cut-out area of an image and a filtering process for an image signal. A system controller obtains information relating to a change in zoom magnification from a zoom changing unit and data relating to a zoom control method from a zoom control method storage unit so as to instruct a zoom controller to perform zoom control. Upon change of an angle of view by controlling the electronic zoom process and the switching of the single focal lens, the zoom controller controls the filtering process performed by the image processing unit so as to equalize the resolution before and after the switching of the single focal lens.

10 Claims, 11 Drawing Sheets

IMAGE PICKUP APPARATUS AND CONTROL METHOD FOR SAME

BACKGROUND OF THE INVENTION

Field of the Invention

The present invention relates to an image pickup apparatus including a plurality of imaging units and a control method for the same.

Description of the Related Art

In recent years, research has been done on image pickup apparatuses utilizing a technology called Computational Photography. With this technology, in addition to simple data such as the brightness and color of an image, information such as an angle of incidence, a depth, and the like of light from an object, which have not been recorded in the conventional image pickup apparatuses, are captured in an imaging element and are stored with image data, so that various types of processes are performed by an image processing LSI. With the use of these pieces of information, a focus, a depth of field controlled by the iris, a focused position, and the like, which have been uniquely determined upon completion of imaging, can be correctly reproduced by image processing after photography. There has been proposed an image pickup apparatus that has a function capable of changing a focal position by post-processing of data of a captured image by recording light beam information called as light field (hereinafter abbreviated as "LF").

As a representative example of obtaining LF data, there is a method for obtaining an image from multiple viewpoints. For example, one image pickup apparatus obtains a plurality of images by varying the focal position and records data as a single image, so that the focused position of the image can be freely changed by image processing at a later time. Data of a plurality of images is obtained by moving the camera in the horizontal direction or the vertical direction, so that distance information (depth) about an object can be obtained from the parallax in images. In this case, there is a disadvantage in that LF data cannot be effectively obtained for a dynamic object because of use of a single image pickup apparatus (imaging element). Thus, there has been proposed a method of using a plurality of imaging elements or image pickup apparatuses in order to obtain an image from multiple viewpoints (Japanese Patent Laid-Open No. 2008-257686). The plurality of imaging elements or image pickup apparatuses are arranged in the form of an array, so that simultaneity can be provided for the obtained images and the amount of information about LF data can be increased by obtaining data of a plurality of images.

If all the imaging systems include a zoom lens in the system including a plurality of imaging elements or image pickup apparatuses, this results in an increase in size of a barrel unit, an increase in power consumption, the complexity of lens control, and the like. As a solution, in the system shown in FIG. 1, imaging units each of which is a combination of each of a plurality of lenses A to D with different focal length and an imaging element corresponding thereto are arranged in the form of a matrix. Optical zoom by the switch control of the lenses is used in combination with electronic zoom by image processing, resulting in a reduction in size, low power consumption, and the simplicity of lens control. However, in order to keep the dimension of an object image constant upon switching a lens with different focal length, the magnification ratio of electronic zoom must be changed abruptly in synchrony with the switching of a lens. Thus, an abrupt change in resolution remains as an undesirable event. As a technology for suppressing an abrupt change in resolution, Japanese Patent Laid-Open No. 2007-329685 discloses a technology that temporarily shifts the control position of the focusing lens by changing an edge enhancement filter coefficient when the number of read lines of the imaging element varies with drive switching of the imaging element.

In the technology disclosed in Japanese Patent Laid-Open No. 2007-329685, an edge enhancement filter coefficient increases when the magnification ratio of electronic zoom is high, resulting in a reduction in the S/N (signal to noise) ratio of an image. When an edge enhancement filter coefficient changes abruptly, an abrupt change in image quality cannot be suppressed due to an abrupt change in the S/N ratio of an image. In addition, the position of the focusing lens must be changed by driving the mechanism. Thus, a long time may be taken from the start of controlling the position of the lens to the completion of actual movement of the lens to a desired position. Therefore, it is difficult to realize a resolution equivalent to the resolution prior to change immediately after the driving of the imaging sensor is switched.

SUMMARY OF THE INVENTION

The present invention provides an image pickup apparatus including a plurality of imaging units. When an electronic zoom process is performed, the image pickup apparatus suppresses an abrupt change in resolution which may occur upon abrupt change in the cut-out area of an image before and after the switching of the lens.

According to an aspect of the present invention, an image pickup apparatus in which a plurality of imaging units each having a lens with different focal length and an imaging element are arranged in a form of a matrix is provided that comprises an image processing unit configured to perform an electronic zoom process for changing an electronic zoom magnification by changing a cut-out area of an image relating to an image signal output from the imaging element and to perform a filtering process for a pixel value of the image in the cut-out area; and a control unit configured to perform zoom control by a change of the imaging unit and the electronic zoom process. The control unit changes the imaging unit upon change of a zoom magnification and performs control for suppressing a change in resolution of an image by the filtering process performed by the image processing unit before and after the change of the imaging unit upon change of an electronic zoom magnification by the image processing unit.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings. Firstly, a description will be given of a configuration in which imaging units including a plurality of lenses with different focal length and imaging elements corresponding to the lenses are arranged in the form of a matrix with reference to FIG. 1.

Figure 1:
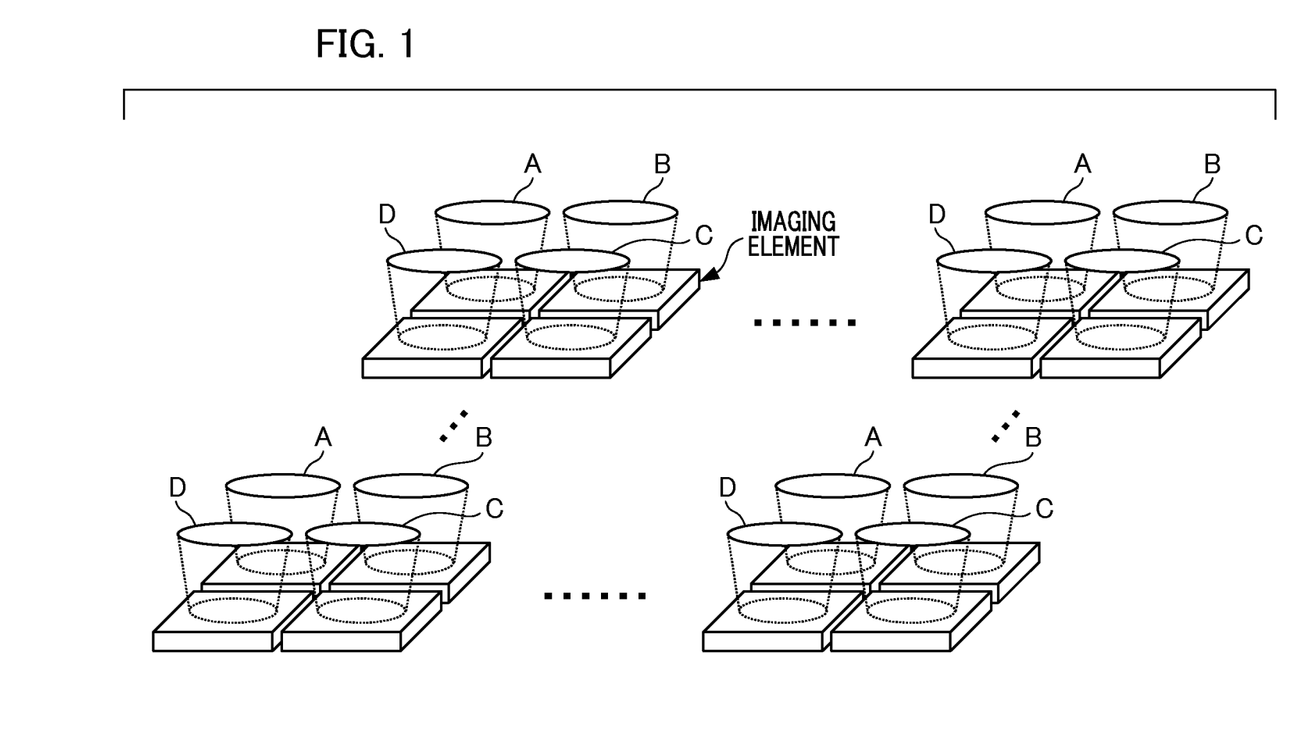
FIG. 1 is an explanatory diagram illustrating a basic configuration of an image pickup apparatus according to the present invention.

FIG. 1 is a schematic explanatory diagram illustrating an imaging unit group in which single focal lenses A, B, C, and D with different focal lengths are combined with imaging elements corresponding to the lenses. Although all the lenses shown in FIG. 1 are represented by the same shape, the actual lenses are in different shapes depending on a focal length for use.

The first lens A has the shortest focal length and is used in wide-angle photography. The focal length is set longer in the order of the second lens B, the third lens C, and the fourth lens D, the focal length can be changed by the switching of the first lens A to these lenses so as to allow shooting at a telephoto side. For example, when an object distance is changed from the state where the distance to an object is short to the state where the distance to the object is long on the basis of the image pickup apparatus, drive control is firstly performed by a combination of the first lens A with focal length A and the imaging element. As the image pickup apparatus is moved away from the object, the photographer performs a zooming operation, so that the image processing unit cuts out an image using electronic zoom (performs the image data extraction process) to change an angle of view. If electronic zoom is performed at a predetermined image magnification or greater, the resolution may be significantly decreased. Thus, control is made to return to the state where a wide area of an image may be cut out by the switching to the second lens B with focal length B. When the distance to the object further becomes longer, the cut-out area of the image is narrowed by using electronic zoom again to execute the electronic enlargement process. Thereafter, hybrid-type zoom control which is a combined use of optical zoom and electronic zoom is performed by the repetition of the operation for the third lens C and the fourth lens D, resulting in a reduction in size, low power consumption, and the simplicity of lens control.

First Embodiment

Figure 2:
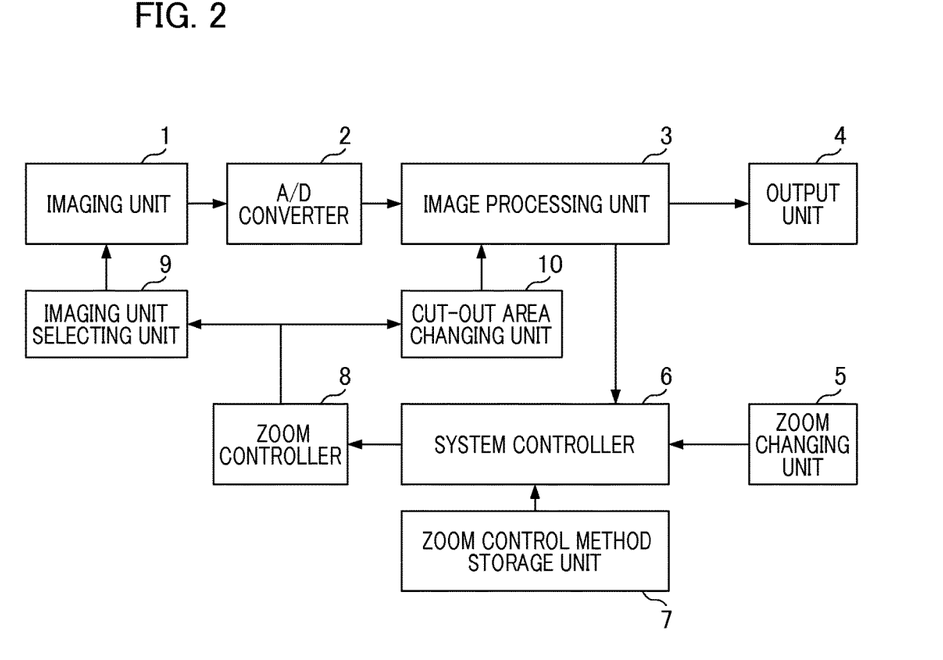
FIG. 2 is a schematic diagram illustrating the major components in a first embodiment of the present invention.

Hereinafter, a description will be given of an image pickup apparatus according to a first embodiment of the present invention. FIG. 2 is a schematic diagram illustrating the major components of the present embodiment.

An imaging unit 1 includes a plurality of imaging units. An A (Analog)/D (Digital) converter 2 converts an output signal from the imaging unit 1 into a digital signal to output it to an image processing unit 3. The image processing unit 3 applies a predetermined process to image data to output it to an output unit 4. The output unit 4 outputs data to record it on a recording medium or to display the image of data on a display unit.

Figure 3:
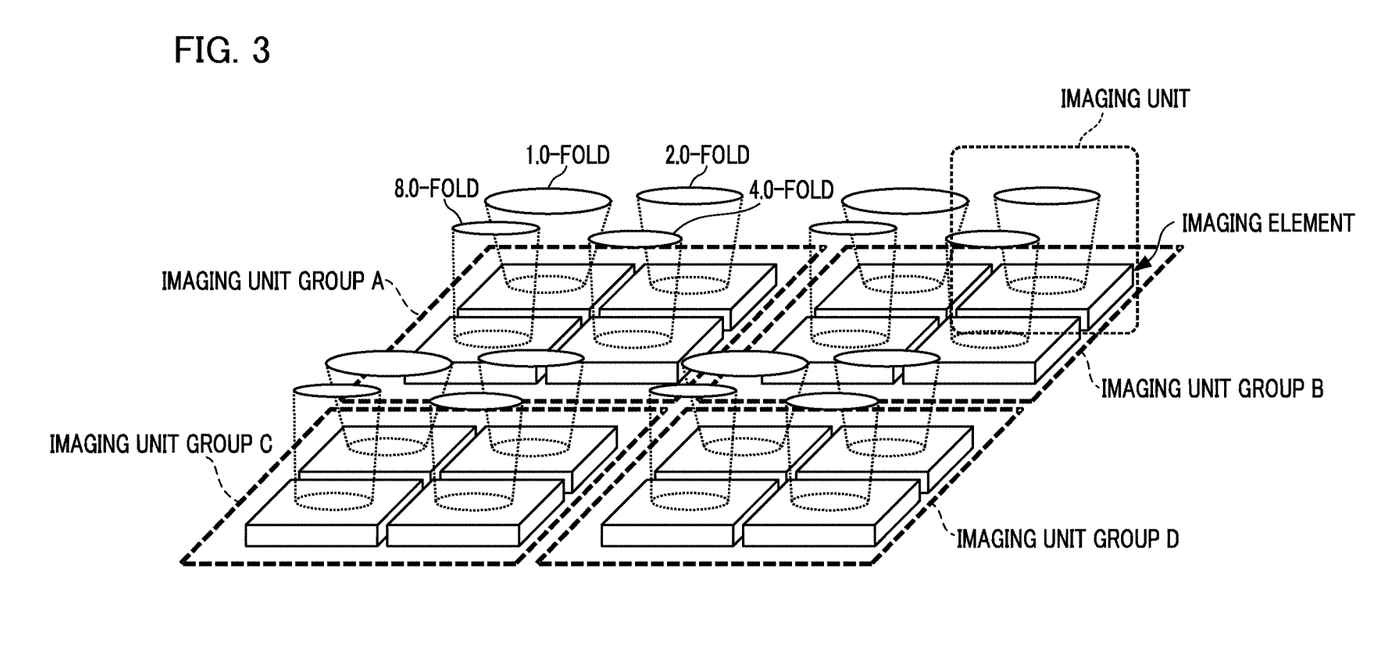
FIG. 3 is a schematic diagram illustrating an imaging unit in the first embodiment.

A description will be given of a configuration of the imaging unit 1 with reference to FIG. 3.

The imaging unit 1 has a configuration in which imaging units each of which is a combination of a single focal lens and an imaging element are arranged in the form of a matrix. For example, single focal lenses consist of four types of lenses with a zoom magnification of 1.0-fold (wide-angle), 2.0-fold, 4.0-fold, and 8.0-fold (telephoto), respectively. Each single focal lens is combined with an imaging element to thereby constitute an imaging unit. As shown in FIG. 3, the first imaging unit with a zoom magnification of 1.0-fold is arranged in the upper left in an imaging unit group, the second imaging unit with a zoom magnification of 2.0-fold is arranged in the upper right in the imaging unit group. The third imaging unit with a zoom magnification of 4.0-fold is arranged in the lower right in the imaging unit group, and the fourth imaging unit with a zoom magnification of 8.0-fold is arranged in the lower left in the imaging unit group. In the present embodiment, an illustration is given of a configuration in which imaging unit groups (four groups from A to D) consisting of imaging units with four different focal lengths are arranged in the form of a matrix. When it is desired to obtain more object position information or when it is desired to change the accuracy of a reproducible focused position, the number of imaging unit groups may be increased or an arrangement interval between imaging unit groups may be changed. Each imaging element in the present embodiment has the same number of pixels for all the imaging units, e.g., 1,920 pixels in the horizontal direction and 1,080 pixels in the vertical direction. The imaging element has a function capable of photoelectrically converting an optical image focused by a single focal lens and outputting it as an analog signal.

An analog signal output from the imaging unit 1 is converted into a digital signal by the A/D converter 2 shown in FIG. 2, and the converted image signal is input to the image processing unit 3. For the configuration shown in FIG. 3, four A/D converters 2 and four image processing units 3 are provided in the present embodiment. In other words, one A/D converter 2 and one image processing unit 3 are assigned to each imaging unit group, and an imaging unit selecting unit 9 selects any one of four imaging units with a different zoom magnification. The output signal of the selected imaging unit is input to the A/D converter 2 corresponding to the imaging unit.

The image processing unit 3 performs various types of image processes such as an image cut-out process for a digital signal output from each A/D converter 2 and filtering process for the cut-out image, and the like. A signal subjected to an image process by the image processing unit 3 is sent to the output unit 4, and then a record processing unit (not shown) records the signal on a recording medium. The number of recording mediums is four, and a process for separately recording output image data on the respective imaging unit groups is executed.

When the photographer wants to change an angle of view depending on the distance to the object, a zoom changing unit 5 is used upon changing a zooming state using an operating member such as a zoom lever. The operation input amount by the zoom changing unit 5 is output to a system controller 6. A zoom control method storage unit (hereinafter simply referred to as "storage unit") 7 stores information regarding zoom control in advance as table data. The information regarding zoom control is the magnification of a single focal lens, the cut-out area of the image, a filtering coefficient for use in the filtering process for an image signal, and the like with respect to a zoom magnification corresponding to a focal length.

The system controller 6 changes an angle of view using a zoom controller 8 so as to obtain a desired angle of view based on the operation input amount detected by the zoom changing unit 5 and information regarding the zoom control method stored in advance in the storage unit 7. The zoom controller 8 controls an imaging unit selecting unit 9 and a cut-out area changing unit 10 based on control information determined by the system controller 6. The control information is information such as the magnification of a single focal lens and the cut-out area of the image. The imaging unit selecting unit 9 selects an imaging unit in accordance with an instruction from the zoom controller 8 to drive the imaging element of the selected imaging unit. Switching of the imaging unit enables the general zoom magnification change process.

The cut-out area changing unit 10 specifies an area for cutting out an image to the image processing unit 3 in accordance with an instruction from the zoom controller 8. The image processing unit 3 cuts out an image based on the specified information to perform an electronic zoom process. Cutting out of an image enables the zoom magnification change process with high accuracy for the switching of a single focal lens.

Next, a specific description will be given of a zoom control method according to the present embodiment. As described above, upon change in angle of view, a process for changing the angle of view to a desired angle of view is performed with a change in imaging unit with different focal length and a change in image cut-out area using the image processing unit 3. A description will be given of a change in zoom magnification by the switching of the single focal lens with reference to FIG. 4.

Figure 4:
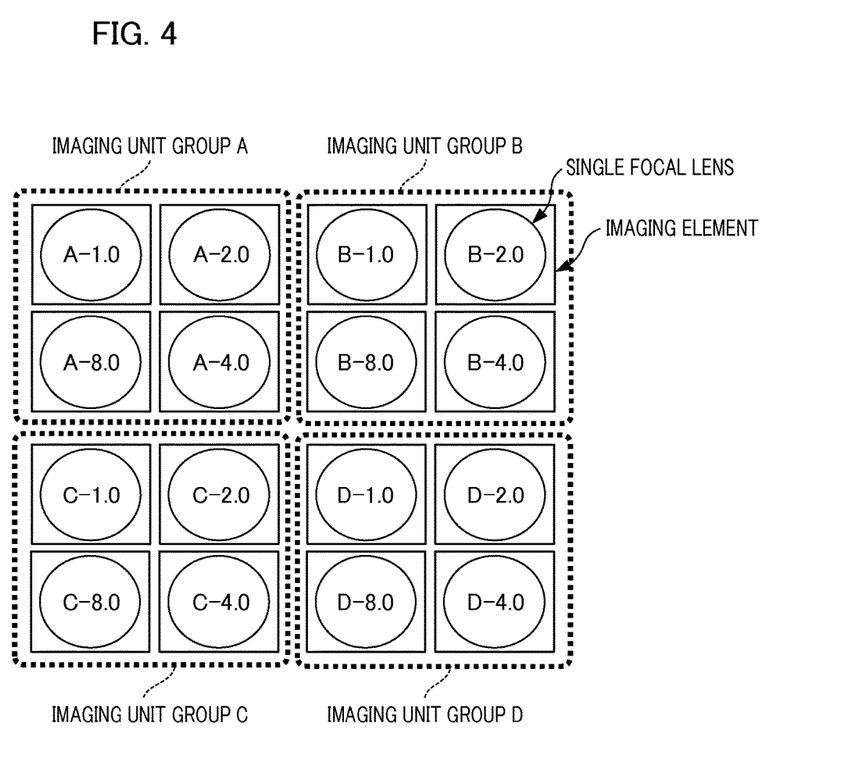
FIG. 4 is a schematic diagram illustrating an imaging unit in the first embodiment.

FIG. 4 schematically illustrates a configuration of a plurality of imaging units arranged side by side in a row. In the present embodiment, the imaging unit groups A to D are included. In the first imaging unit group A, an imaging unit of which the single focal lens has a magnification of X-fold is denoted as "A-X". For example, the symbol "A-2.0" represents an imaging unit of which the single focal lens has a magnification of 2.0-fold. The same notation method is used for the second imaging unit group B, the third imaging unit group C, and the fourth imaging unit group D.

When the zoom magnification is set in a range from 1.0-fold to 2.0-fold, the four imaging units of A-1.0, B-1.0, C-1.0, and D-1.0 are driven. When the zoom magnification is set in a range from 2.0-fold to 4.0-fold, the four imaging units of A-2.0, B-2.0, C-2.0, and D-2.0 are driven. When the zoom magnification is set in a range from 4.0-fold to 8.0-fold, the four imaging units of A-4.0, B-4.0, C-4.0, and D-4.0 are driven. When the zoom magnification is set to be greater than 8.0-fold, the four imaging units of A-8.0, B-8.0, C-8.0, and D-8.0 are driven. As described above, the imaging unit selecting unit 9 selects an imaging unit from the imaging unit groups A, B, C, and D in order to realize an appropriate angle of view such that a zoom magnification desired by the photographer can be obtained so as to drive the imaging element of the selected imaging unit.

Figure 5:
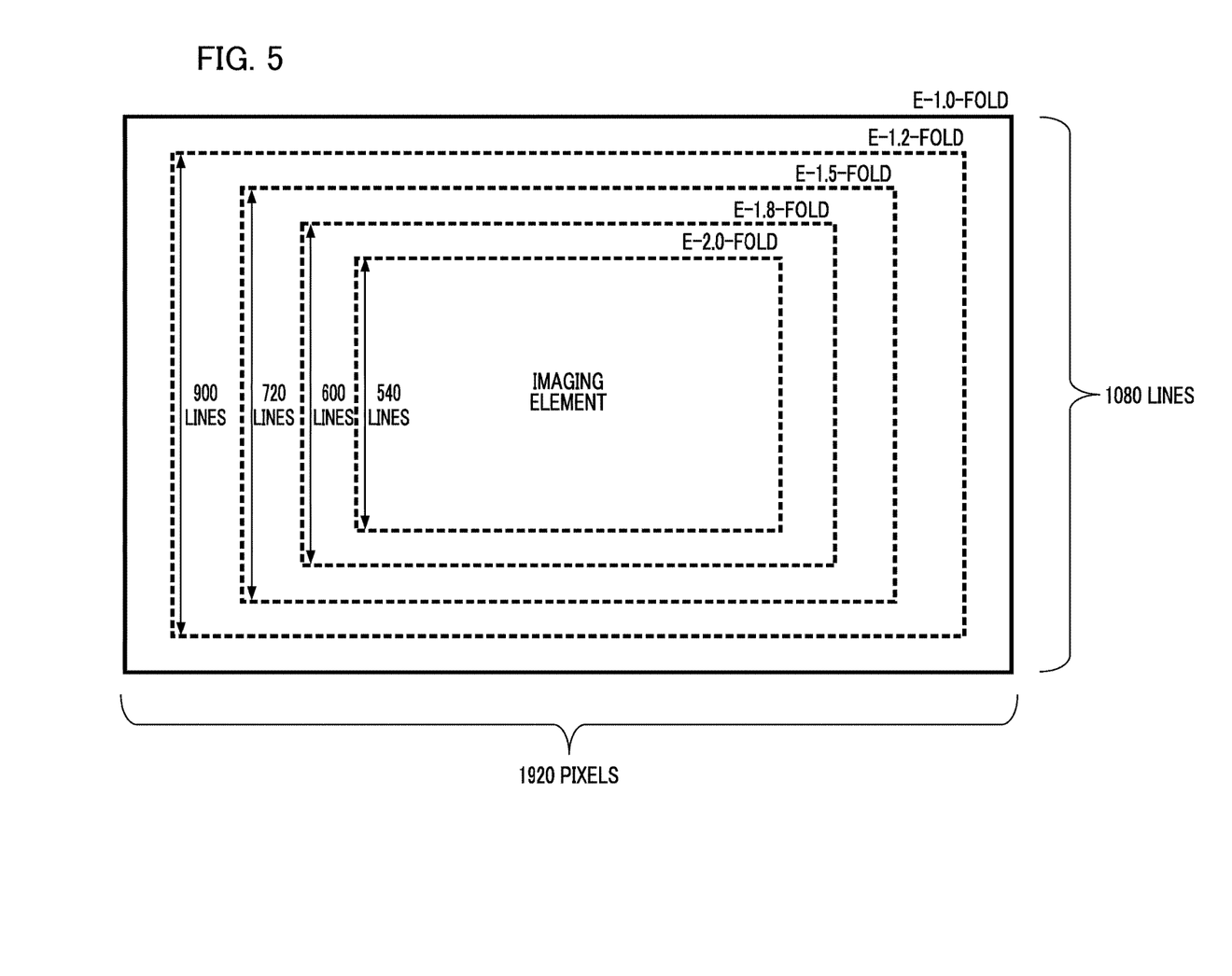
FIG. 5 is an explanatory diagram illustrating the image cut-out range of the imaging element in the first embodiment.

Next, a description will be given of the electronic zoom magnification change process due to the cutting out of an image with reference to FIG. 5. FIG. 5 schematically illustrates a cut-out area for each zoom magnification when the image processing unit 3 changes the cut-out area of the image. In the present embodiment, a cut-out area is changed up to the state where the electronic zoom magnification is 2.0-fold, i.e., the size of the image cut-out area becomes ½ so as to change an angle of view with high accuracy.

Firstly, when the electronic zoom magnification is 1.0-fold, the image processing unit 3 does not cut out an image. In other words, the rectangular area shown in E-1.0-fold in FIG. 5, i.e., pixel data of 1,920 pixels in the horizontal direction and 1,080 lines in the vertical direction is used as it is. When the electronic zoom magnification is 1.2-fold, a stepped-down rectangular area as shown in E-1.2-fold in FIG. 5 is used, and a process for cutting out an area of 900 lines including the screen central portion is executed. When the electronic zoom magnification is 1.5-fold, the rectangular area (720 lines) of E-1.5-fold in FIG. 5 is cut out, whereas when the electronic zoom magnification is 1.8-fold, the rectangular area (600 lines) of E-1.8-fold in FIG. 5 is cut out. When the electronic zoom magnification is 2.0-fold, the rectangular area (540 lines) of E-2.0-fold in FIG. 5 is cut out. Although no specific description will be given of the number of pixels to be cut out in the horizontal direction in each rectangular area, it should be noted that the number of pixels to be cut out is set to an appropriate number of pixels in accordance with the size of the rectangular frame.

In the present embodiment, the electronic zoom magnification can be changed in detail by the image cut-out process, and a combination of an electronic zoom magnification and an optical zoom magnification enables a change in zoom magnification with high accuracy depending on the cut-out area of the image.

Figure 6:
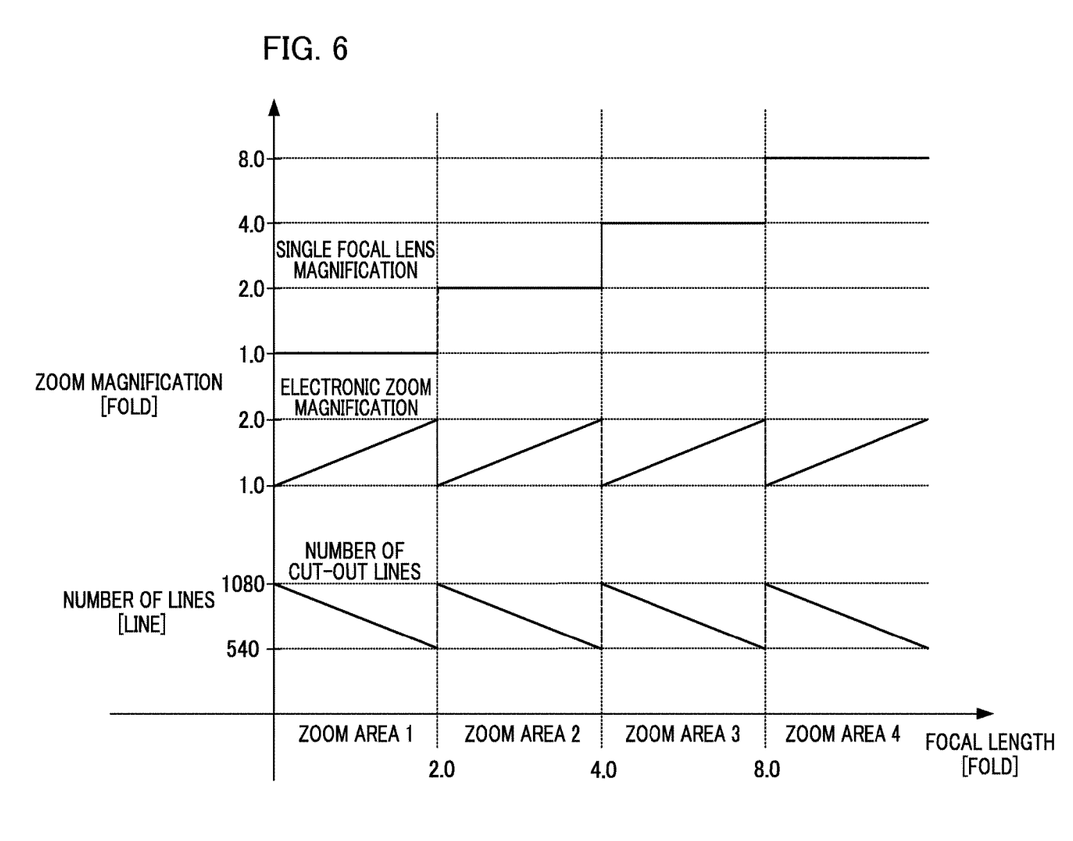
FIG. 6 is an explanatory diagram illustrating a zoom control method in the first embodiment.

A description will be given of zoom control in the present embodiment based on the combined use of an optical zoom and an electronic zoom with reference to FIG. 6. FIG. 6 is a graph illustrating an optical zoom magnification of a single focal lens, an electronic zoom magnification due to the cutting out of an image, and the number of cut-out lines with respect to a focal length. The zoom areas denoted by number 1 to 4 in circular frames are as follows:

First zoom area: Focal length area corresponding to a zoom magnification of 1.0 to 2.0.
Second zoom area: Focal length area corresponding to a zoom magnification of 2.0 to 4.0.
Third zoom area: Focal length area corresponding to a zoom magnification of 4.0 to 8.0.
Fourth zoom area: Focal length area corresponding to a zoom magnification of greater than 8.0.

Firstly, when the focal length is 1.0-fold, the zoom controller 8 drives the imaging unit only of which the single focal lens is 1.0-fold magnification. In this case, the electronic zoom magnification due to the cutting out of an image is set to 1.0-fold. As the focal length increases, the image processing unit 3 executes a process for gradually narrowing an image cut-out area. For example, when the zoom magnification is 1.5-fold, the number of cut-out lines is set to 720 lines. When the zoom magnification is further increased to 2.0-fold, the number of cut-out lines is set to 540 lines. When the zoom magnification is further increased, the imaging unit selecting unit 9 switches the imaging unit with 1.0-fold magnification to the imaging unit with 2.0-fold magnification. At this time, a process for returning the number of cut-out lines from 540 lines back to 1,080 lines again is executed.

Likewise, when the zoom magnification is changed to 3.0-fold, the relationship of 3.0 (current zoom magnification)/2.0 (zoom magnification by the single focal lens)=1.5 (magnification to be changed due to a change in cut-out area) is satisfied. In this case, the number of cut-out lines is set to 720 lines. When the zoom magnification is further increased from this state to 4.0-fold and the number of cut-out lines becomes 540 lines, the imaging unit selecting unit 9 switches the imaging unit with 2.0-fold magnification to the imaging unit with 4.0-fold magnification. At this time, a process for returning the number of cut-out lines from 540 lines back to 1,080 lines again is executed. Thereafter, the same operation is performed. When the zoom magnification is changed to 16-fold, the imaging unit selecting unit 9 selects the imaging unit of which the single focal lens is 8.0-fold magnification, and the image processing unit 3 sets the number of cut-out lines to 540 lines. Then, the zoom controller 8 stops zoom control. Alternatively, when the zoom controller 8 does not stop zoom control and further increases a zoom magnification, a process for narrowing the image cut-out area by setting the number of cut-out lines from 540 lines to any value less than that by the image processing unit 3 is executed.

As described above, a change in single focal lens by the selection of the imaging unit and a change in image cut-out area are executed in combination so as to change the zoom magnification. In order to implement such control, a table data describing the relationship between the magnification of a single focal lens at each focal length and the number of image cut-out lines is stored in advance in the storage unit 7. Upon switching of the optical zoom magnification under such zoom control, i.e., upon switching of the single focal lens at the zoom magnification of 2.0-fold, 4.0-fold, or 8.0-fold, the resolution abruptly increases with an abrupt change in the cut-out area of the image, resulting in providing an image having noticeable unnaturalness. Thus, in the present embodiment, the filtering process to be described below is simultaneously performed with the zoom control so as to suppress an abrupt change in resolution.

As in the typical digital filter process, the filtering process in the present embodiment refers to a process for generating a pixel value of one pixel by using a pixel value of a plurality of pixels with respect to each pixel value of the cut-out image (a process for reducing the resolution). While, in the present embodiment, a description will be given of the filtering process in the vertical direction for ease of explanation, the same process is also applicable in the horizontal direction. A specific description will be given of the filtering process in the vertical direction with reference to FIG. 7.

Figure 7:
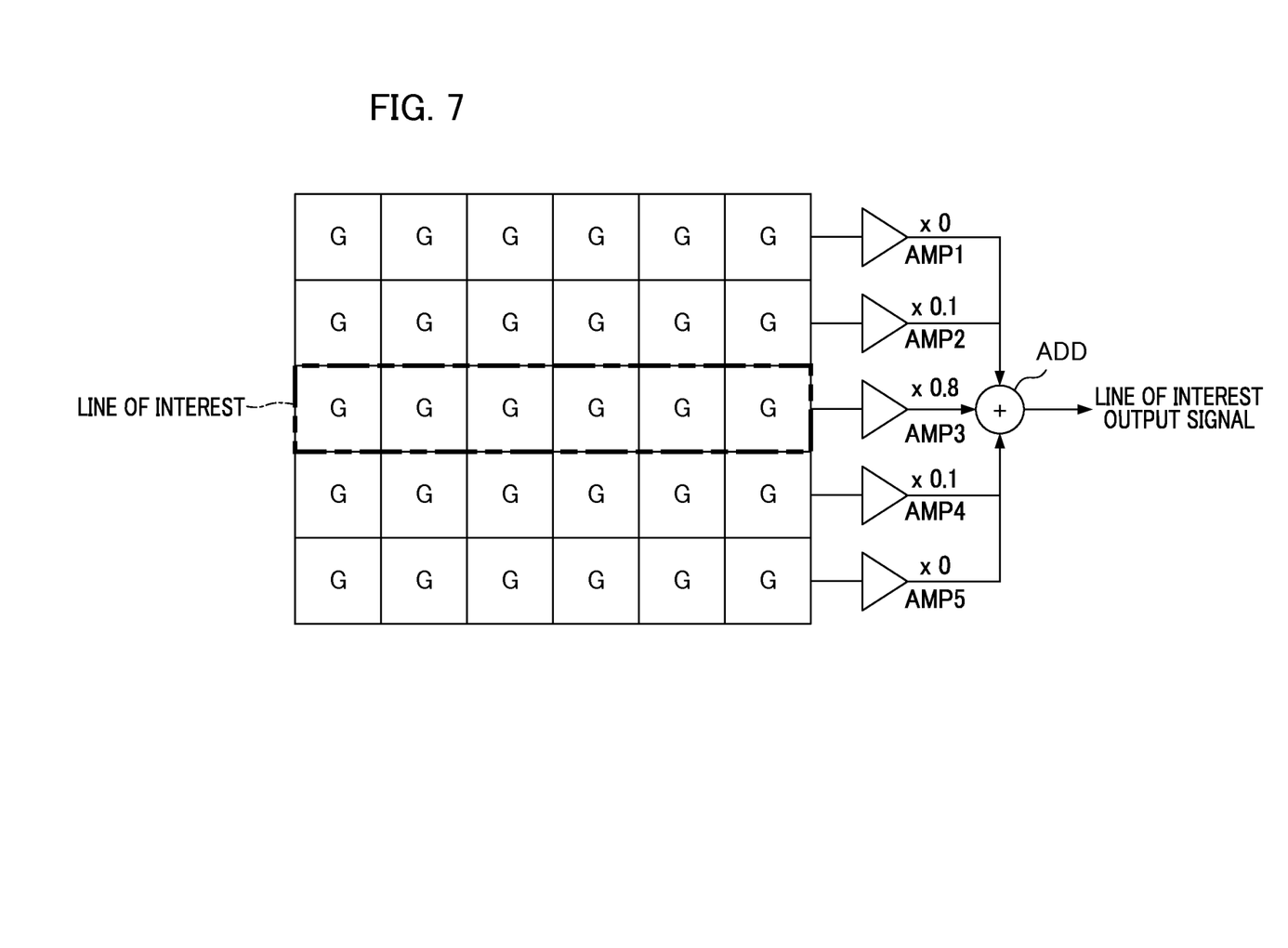
FIG. 7 is an explanatory diagram illustrating filtering process in the first embodiment.

FIG. 7 is a diagram illustrating extraction of 5 lines from G (Green) pixel lines in sequence in the vertical direction. Amplifiers (amps 1 to 5) are respectively connected to the output units of 5 lines. Different gain values are set to these amplifiers for each filtering coefficient (a strength of the filtering) to be described below. The filtering coefficient refers to a coefficient for determining how much a frequency band is reduced for each line with respect to an obtained input image. When the resolution is significantly decreased, a filtering coefficient is set to a large value, whereas when there is almost no need to decrease the resolution, a filtering coefficient is set to a small value. The line of interest in FIG. 7 is the 3rd line. The key point upon filtering is that the ratio between the third gain value to be set to the amp 3 and a gain value to be set to other amplifiers (the amps 1, 2, 4, and 5) is high or low. As a gain value for the line of interest is relatively higher than that for other lines, the dependency to other lines is reduced. Thus, a filtering coefficient becomes small. On the other hand, as a gain value for the line of interest is relatively lower than that for other lines, the dependency to other lines is increased. Thus, a filtering coefficient becomes large.

Next, a specific description will be given of the method for setting a gain for each amplifier corresponding to a filtering coefficient. In the present embodiment, a filtering coefficient is represented by a numerical value calculated by the following Formula.

Filtering coefficient=the number of cut-out lines/the number of lines corresponding to the resolution desired to be achieved   [Formula 1]

The number of lines corresponding to the resolution desired to be achieved is the number of lines corresponding to the resolution after change. For example, assume the case where the number of cut-out lines is 900 lines and the resolution corresponding to 600 lines is desired to be achieved. In this case, the filtering coefficient is $\frac{3}{2}$ which is $\frac{900}{600}$ by Formula (1). This means that, when the cut-out image consists of 3 lines, the filtering process must be performed such that the cut-out image is equal to the state where an object having the same size as the cut-out image has the resolution consisting of 2 lines. In the present embodiment (see FIG. 5), the filtering coefficient becomes the highest ($\frac{1080}{540}$=2.0) when the resolution corresponding to 540 lines is reproduced from the cut-out 1,080 lines. Specifically, the gain set values for the amps 1 to 5 corresponding to each coefficient must be determined within the range of the filtering coefficient from 1.0 to 2.0.

More specifically, for example, a description will be given of a filtering coefficient upon switching of the imaging unit. Given that the filtering coefficient is 2.0, the gain values for the amplifiers may be set such that the resolution is just reduced by half. In other words, the gain settings may be made to be equal to the state where 2 lines are averaged, the following gain settings may be made for the even-numbered lines:

Set the gain values for the amps 1, 2, and 5 to 0-fold.
Set the gain values for the amps 3 and 4 to 0.5-fold.

On the other hand, the following gain settings may be made for the odd-numbered line:

Set the gain values for the amps 1, 4, and 5 to 0-fold.
Set the gain values for the amps 2 and 3 to 0.5-fold.

With such settings, the output signal of the line of interest obtained by adding the outputs of the amplifiers by the adder (FIG. 7: ADD) is a signal equivalent to the case where pixel addition is performed between 2 lines, i.e., the line of interest and the next line, and thus, the resolution is just reduced by half.

The filtering process is performed by setting the gain values for the amplifiers corresponding to the lines in accordance with a filtering coefficient, resulting in a change in resolution. Data of the gain set values for the amplifiers corresponding to a filtering coefficient is stored in advance in the storage unit 7. Upon changing a filtering coefficient depending on the zoom magnification, the gain set value for the amplifier used for filtering process is changed at any time so as to obtain a desired resolution. In this manner, an abrupt change in resolution which may occur upon an abrupt change in image cut-out area may be suppressed by the filtering process in the vertical direction.

Figure 8:
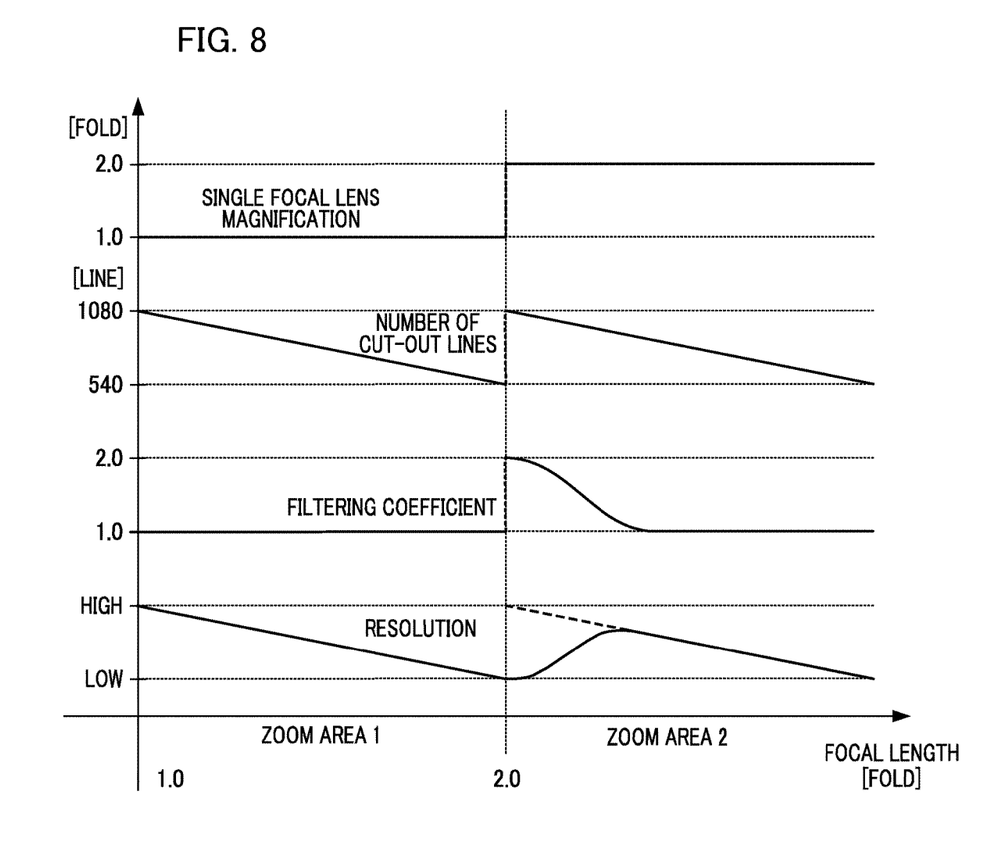
FIG. 8 is an explanatory diagram illustrating a zoom control method including filtering process in the first embodiment.

Next, a specific description will be given of zoom control including the filtering process with reference to FIG. 8. FIG.

8 illustrates changes in a magnification of a single focal lens, the number of cut-out lines, a filtering coefficient, and a resolution with respect to a focal length in the first and second zoom areas shown in FIG. 6. A magnification of a single focal lens and the number of cut-out lines are the same as those in FIG. 6.

Firstly, a description will be given of a filtering coefficient.

When the zoom magnification is less than 2.0-fold, the filtering coefficient is always set to 1.0 (no filtering). When the zoom magnification is 2.0-fold, the number of image cut-out lines is abruptly changed from 540 lines to 1,080 lines. Thus, the filtering coefficient is changed from 1.0 to 2.0. The fact that the filtering coefficient is 2.0 means that the gain settings for the amplifiers are made so as to reduce the resolution by half. As a further increase in zoom magnification, the process for making the filtering coefficient asymptotically approach to 1.0-fold by gradually decreasing it.

Next, a description will be given of a change in resolution.

When the zoom magnification is gradually increased from 1.0-fold, the cut-out area of the image is gradually narrowed, resulting in a gradual decrease in resolution with an increase in focal length. At this time, the filtering coefficient is always in the state of 1.0, resulting in a decrease in resolution in proportion to the amount of reduction in the number of cut-out lines. When the zoom magnification is 2.0-fold, the magnification of a single focal lens is 2.0 and the number of cut-out lines is changed from 540 lines to 1,080 lines at the same time. However, the filtering coefficient is set to a value as described above such that the resolution is reduced by half, the resolution of the cut-out image consisting of 1,080 lines is reduced to 540 lines. When the zoom magnification is further increased from this state, the filtering coefficient is gradually decreased, resulting in a gradual increase in resolution. When the zoom magnification is further increased, the filtering coefficient finally reaches 1.0. At this time, image data is output as it is without performing the filtering process for the cut-out image. When the zoom magnification is further increased, the resolution is gradually decreased again in proportion to the number of cut-out lines.

Hereinafter, a description will be given of the concept of a change in resolution.

Figure 9:
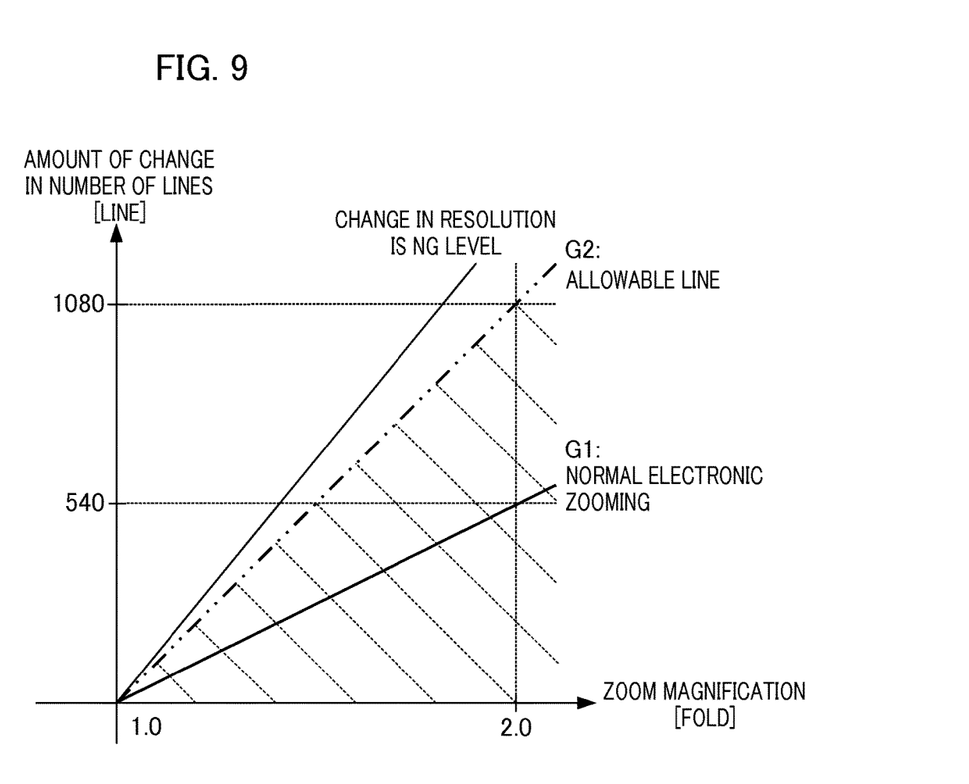
FIG. 9 is a diagram illustrating the amount of change in the number of lines with respect to zoom magnification in the first embodiment.

The present invention suppresses an abrupt change in resolution. Specifically, an object of the present invention is to suppress an abrupt change in resolution with a change in focal length. Thus, a description will be given of how the target resolution is set. Basically, settings are made as shown in FIG. 9 such that a change in resolution with a change in focal length, i.e., the amount of change in the number of lines is equal to or less than a constant value. The amount of change in the number of lines is an amount which takes into account a change in the number of actual cut-out lines and the amount of a pseudo change in the number of lines by the filtering process.

In FIG. 9, the zoom magnification is plotted on the horizontal axis and the amount of change in the number of lines is plotted on the vertical axis. The amount of change in the number of lines due to a cut-out of the image is 540 lines at a zoom magnification from 1.0-fold to 2.0-fold. The graph line G1 in this case is a graph line at the normal electronic zoom in FIG. 9. In the present embodiment, the graph line G2 having a slope which is two times as steep as the graph line G1 is set as an allowable line. In other words, the amount of change in the number of lines which is two times as compared with that at the normal electronic zoom, i.e., the amount of change in 1,080 lines is permitted. In practice, an allowable line needs to be determined based on the actual appearance of a photographed image upon a change in the number of lines. If the slope of an allowable line is set to be excessively small in order to suppress an abrupt change in resolution, the effect of improvement in resolution due to the switching of a single focal lens is reduced. Thus, the slope of the allowable line is set as large as possible in the range where adverse effects on the image due to the switching of a single focal lens cannot be seen by the photographer.

According to the present embodiment, the resolution is pseudo-decreased with an increase in filtering coefficient immediately after the switching of the zoom magnification of the imaging unit, so that an abrupt change in resolution in association with the switching of a single focal lens can be suppressed. In the present embodiment, the filtering process is performed for an image signal so as to equalize the resolution before and after the switching of the single focal lens. Thus, an abrupt change in resolution due to an abrupt change in the number of image cut-out lines can be suppressed before and after the switching of the single focal lens. After the switching of the single focal lens, control is performed to return a filtering coefficient gradually back to a value prior to change, so that a change in resolution can be made difficult to be seen on the image.

Second Embodiment

Next, a description will be given of an image pickup apparatus according to a second embodiment of the present invention. In the present embodiment, the difference from the first embodiment lies in the fact that zoom control can be made at a plurality of zoom speeds. For example, assume that there are three types of zoom speeds, i.e., a speed A, a speed B, and a speed C in descending order. In the present embodiment, components corresponding to or similar to those in the first embodiment are designated by the same reference numerals, and therefore, its explanation will be omitted.

In the system configuration of the present embodiment, a zoom speed can be step wisely changed in accordance with the instruction given from the zoom changing unit 5 shown in FIG. 2. The system controller 6 also determines a zoom speed based on instruction information from the zoom changing unit 5. In other words, any one of the speeds A, B, and C is determined as the zoom speed. The storage unit 7 stores a filtering coefficient in each focal length as a group of three types of data for each zoom speed (A, B, and C).

Figure 10:
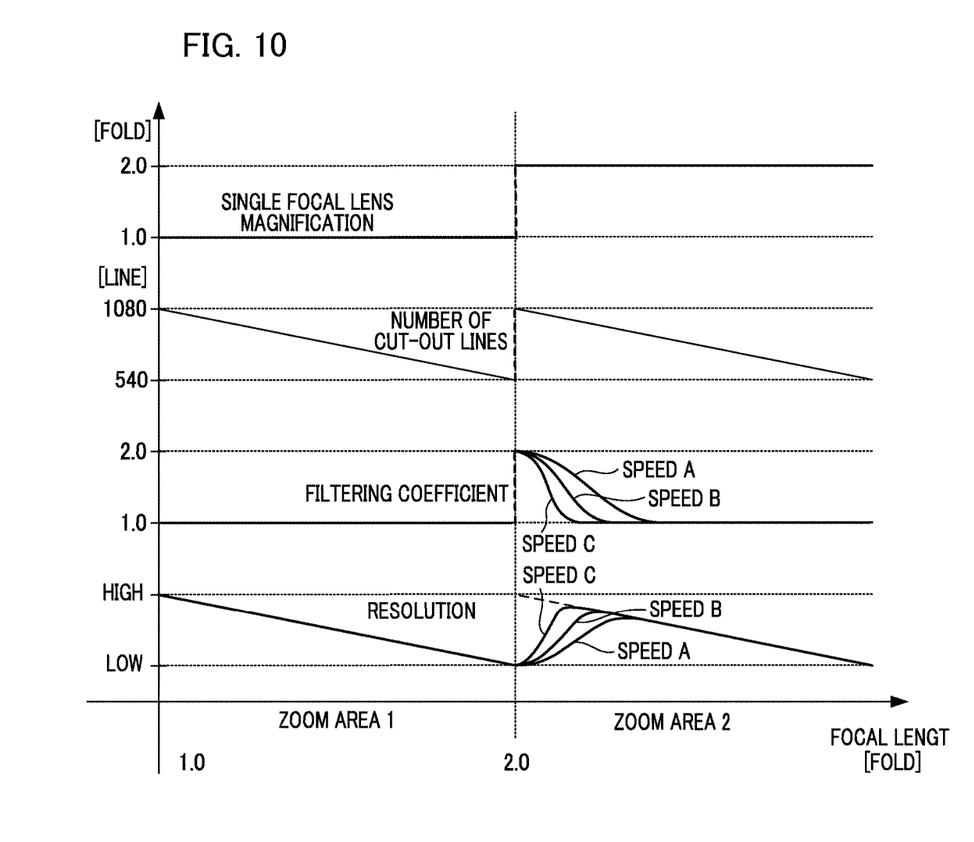
FIG. 10 is an explanatory diagram illustrating a zoom control method in a second embodiment of the present invention.

A description will be given of zoom control in the present embodiment with reference to FIG. 10. The magnification of a single focal lens and the number of cut-out lines are controlled as in the first embodiment, and thus, explanation thereof will be omitted. A description will be given of the differences from the first embodiment.

Figure 11:
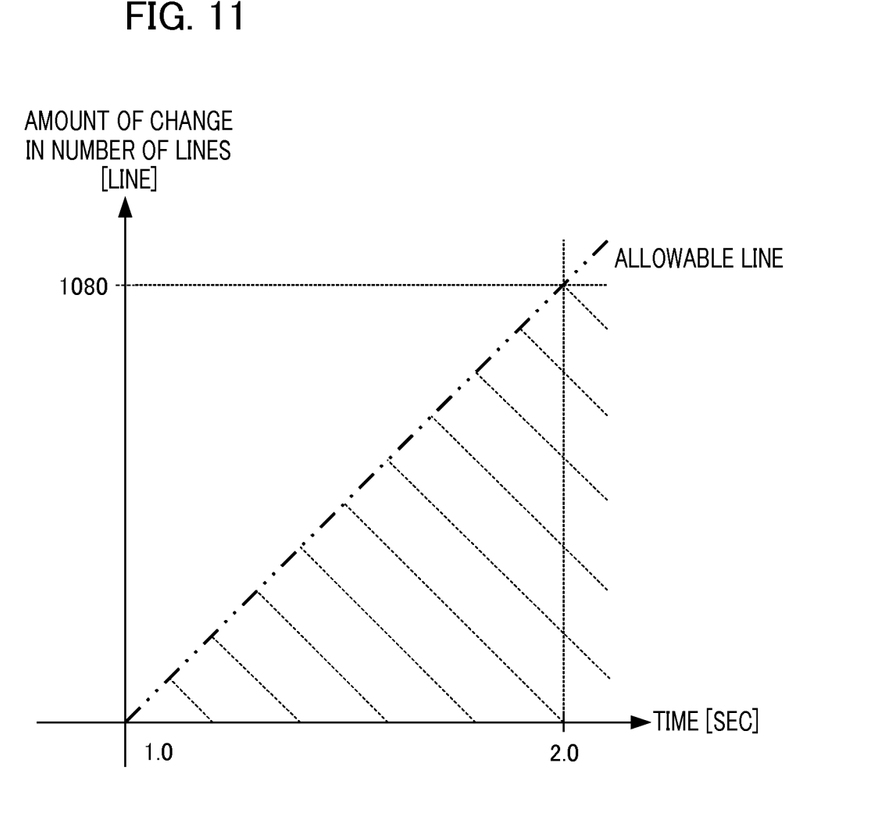
FIG. 11 is a diagram illustrating the amount of change in the number of lines with respect to time in the second embodiment.

In the present embodiment, the process for changing a filtering coefficient depending on a zoom speed is performed after the switching of an imaging unit. A focal length used until the filtering coefficient is restored from 2.0 back to the state of 1.0 (no filtering) is set to be longer with an increase in the zoom speed. This is because a change in focal length is fast when the zoom speed is high, and thus, the amount of change in the number of lines per unit time is increased. Consequently, a change in resolution readily appears prominently. Thus, as shown in FIG. 11, a filtering coefficient for each focal length is set such that the amount of change in the number of lines per unit time is equal to or less than a predetermined allowable line. The horizontal axis shown in FIG. 11 is a time axis representing an elapsed time. The vertical axis represents the amount of change in the number of lines. In this example, the range (the shaded part indicated by the dotted line) equal to or less than 1,080 lines per second is set as an allowable range.

In the present embodiment, in the system which variably controls a zoom speed, the amount of change in the number of lines per unit time is restricted to equal to or less than a constant value. A different filtering coefficient is applied depending on a zoom speed, so that an abrupt change in resolution can be suppressed at each zoom speed. Thus, a change in resolution after the switching of the single focal lens is normalized at any zoom speed.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-156070, filed on Jul. 31, 2014, which is hereby incorporated by reference wherein in its entirety.

What is claimed is:

1. An image pickup apparatus in which a plurality of imaging units, each having a lens with a different focal length and an imaging element, are arranged in a form of a matrix, the image pickup apparatus comprising:
   an image processing unit configured to perform an electronic zoom process for changing an electronic zoom magnification by changing a cut-out area of an image relating to an image signal output from a selected imaging element and to perform a filtering process for a pixel value of the image in the cut-out area; and
   a control unit configured to perform zoom control by changing the selected imaging unit and performing the electronic zoom process,
   wherein the control unit changes the selected imaging unit upon a change of a zoom magnification and performs control for suppressing a change in a resolution of the image by the filtering process performed by the image processing unit before and after the change of the selected imaging unit upon the changing of the electronic zoom magnification by the image processing unit, and
   wherein the control unit calculates a filtering coefficient, for use in the filtering process, using a ratio of a number of cut-out lines of the image to a number of lines that correspond to the changed resolution.

2. The image pickup apparatus according to claim 1, further comprising:
   a selecting unit configured to select any one of the plurality of imaging units according to instructions from the control unit; and
   a changing unit configured to change the cut-out area of the image according to instructions from the control unit,
   wherein the control unit performs control for changing the filtering coefficient when the selecting unit changes the imaging unit and the image processing unit changes the electronic zoom magnification in accordance with the cut-out area of the image to be changed by the changing unit.

3. The image pickup apparatus according to claim 2, wherein, when zoom control is performed at a plurality of zoom speeds, the control unit performs control for changing the filtering coefficient for each of the zoom speeds.

4. The image pickup apparatus according to claim 3, wherein, upon change of the zoom magnification, the control unit performs control for changing the electronic zoom magnification and the filtering coefficient in a case that the selecting unit changes the selected imaging unit and then sets the focal length used to be longer with an increase in the zoom speed until the filtering coefficient is restored to a value of the filtering coefficient prior to the change of the filtering coefficient.

5. The image pickup apparatus according to claim 1, further comprising:
   a zoom changing unit configured to instruct a change in the zoom magnification; and
   a storage unit configured to store data, such as a magnification of the lens, the cut-out area of the image, and the filtering coefficient, with respect to the zoom magnification, as information relating to the zoom control,
   wherein the control unit controls the change of the imaging unit and the change of the electronic zoom magnification in accordance with information indicating an instruction about the change in the zoom magnification from the zoom changing unit and data relating to the zoom control stored in the storage unit.

6. The image pickup apparatus according to claim 1, wherein, upon change of the zoom magnification, the control unit performs control for causing the image processing unit to change the electronic zoom magnification in a first zoom area, where the imaging unit is not changed, and the control unit performs control for causing the image processing unit to change the electronic zoom magnification and to suppress the change in the resolution in association with the change of the electronic zoom magnification by changing the filtering coefficient when the first zoom area is switched to a second zoom area having a longer focal length than the first zoom area as a result of the change of the selected imaging unit.

7. The image pickup apparatus according to claim 6, wherein, when the first zoom area is switched to the second zoom area, the control unit performs the filtering process by changing the filtering coefficient and then performs control of the filtering coefficient such that a value of the filtering coefficient gradually and asymptotically approaches a value of the filtering coefficient prior to the change of the filtering coefficient, and increasing the focal length.

8. The image pickup apparatus according to claim 1, wherein the image processing unit sets a gain value of an amplifier corresponding to each pixel line to the filtering coefficient and performs the filtering process by summing an output of the amplifier.

9. The image pickup apparatus according to claim 8, wherein, if a value of the filtering coefficient is small, the image processing unit sets the gain value of a line of interest among a plurality of pixel lines to be relatively greater than a gain value of a line differing from the line of interest, whereas if the value of the filtering coefficient is large, the image processing unit sets the gain value of the line of interest to be relatively less than the gain value of the line differing from the line of interest.

10. A control method to be executed by an image pickup apparatus in which a plurality of imaging units, each having a lens with a different focal length and an imaging element, are arranged in a form of a matrix, the method comprising:
   performing, by an image processing unit, an electronic zoom process for changing an electronic zoom magnification by changing a cut-out area of an image relating to an image signal output from a selected imaging element and a filtering process for a pixel value of the image in the cut-out area; and performing, by a control unit, a zoom control by changing the selected imaging unit and performing the electronic zoom process, wherein the control unit changes the selected imaging unit upon a change of a zoom magnification and performs control for suppressing a change in a resolution of the image by the filtering process performed by the image processing unit before and after the change of the selected imaging unit upon the changing of the electronic zoom magnification by the image processing unit, and wherein the control unit calculates a filtering coefficient, for use in the filtering process, using a ratio of a number of cut-out lines of the image to a number of lines that correspond to the changed resolution.

* * * * *